United States Patent
Everett et al.

[11] Patent Number: 6,056,907
[45] Date of Patent: May 2, 2000

[54] IN SITU-FORMED DEBOND LAYER FOR FIBERS

[75] Inventors: Richard K. Everett; Alan S. Edelstein, both of Alexandria, Va.; John H. Perepezko, Madison, Wis.

[73] Assignee: The United States of America as represented by the Secretary of the Navy, Washington, D.C.

[21] Appl. No.: 08/831,282

[22] Filed: Mar. 31, 1997

[51] Int. Cl.[7] .................................................. B29C 71/00
[52] U.S. Cl. ...................... 264/235; 264/624; 264/625; 264/640; 427/215; 427/226; 427/228
[58] Field of Search .............................. 264/60, 624, 625, 264/640, 643, 235; 156/89, 62.2; 427/215, 226, 227, 228, 255.2, 258

[56] References Cited

U.S. PATENT DOCUMENTS

| | | | |
|---|---|---|---|
| 5,162,271 | 11/1992 | Carpenter et al. | 501/95 |
| 5,202,059 | 4/1993 | Kennedy | 252/389 |
| 5,580,643 | 12/1996 | Kennedy et al. | 428/212 |
| 5,585,165 | 12/1996 | Kennedy et al. | 428/212 |
| 5,593,728 | 1/1997 | Moore et al. | 427/255.2 |
| 5,682,594 | 10/1997 | Kennedy et al. | 428/549 |
| 5,707,471 | 1/1998 | Petrak et al. | 156/89 |
| 5,725,825 | 3/1998 | Zank | 264/625 |

*Primary Examiner*—Merrick Dixon
*Attorney, Agent, or Firm*—Barry A. Edelberg; Ralph T. Webb

[57] ABSTRACT

A debonding layer is formed on fibers such as silicon carbide fibers by forming a thin film of a metal such as nickel or iron on the silicon carbide fibers and then annealing at a temperature of about 350–550° C. to form a debond layer of a metal silicide and carbon. These fibers having the debond coating can be added to composite forming materials and the mixture treated to form a consolidated composite. A one heating-step method to form a consolidated composite involves inserting the silicon carbide fibers with just the initial metal film coating into the composite forming materials and then heating the mixture to form the debond coating in situ on the fibers and to form the consolidated composite. Preferred heating techniques include high temperature annealing, hot-pressing, or hot isostatic pressing (HIP).

21 Claims, 4 Drawing Sheets

IN SITU-FORMED DEBOND LAYER FOR FIBERS

BACKGROUND OF THE INVENTION

1. Field of the Invention

This invention relates to an in situ method for producing debond coating on silicon carbide fibers to be incorporated in a composite and the resulting product.

2. Description of the Related Art

Current debond coatings are usually applied to fibers by chemical vapor deposition (CVD) or chemical vapor infiltration (CVI). These techniques are generally slow and costly. High temperatures, special atmospheres, special chemicals and special apparatus increase costs. Coatings sometimes contain defects due to touching fibers and incomplete spreading of fiber tows. Typical debond layer materials are carbon such as described by R. C. Loszewski in U.S. Pat. No. 5,024,889 and by H. Sakamoto in U.S. Pat. No. 5,055,430 and boron nitride as described by T. L. Jessen in U.S. Pat. No. 5,407,740 and R. Rice in U.S. Pat. No. 4,642,271. Special handling is generally used to prevent damage to the debond coatings. The ability to place a nickel coating on a fiber is shown by L. G. Morin in U.S. Pat. No. 4,942,090 on carbon fibers.

3. Objects of the Invention

It is an object of this invention to control bonding between the fiber reinforcements and the matrix in composite materials.

It is a further object of this invention to improve composite properties by providing a debonding layer on fibers in ceramic matrix composites.

It is a further object of this invention to provide tailored debond layers which absorb energy and make for tougher composite materials.

It is a further object of this invention to provide improved, in situ produced debond coatings on silicon carbide fibers which may be used in composites to produce superior products.

It is a further object of this invention to provide debond coatings on silicon carbide fibers where there is an outer layer containing nickel silicide, $Ni_2Si$, and carbon.

It is a further object of this invention to provide composite precursors where the composite forming material contains silicon carbide fibers with improved debond coatings.

These and further objects of the invention will become apparent as the description of the invention proceeds.

SUMMARY OF THE INVENTION

A debonding coating is formed on fibers, and especially silicon carbide fibers, by forming a thin film of a metal or metal silicon alloy on silicon carbide fibers and annealing the fibers at a temperature sufficient to produce an effective amount of a metal silicide and carbon to form a debond coating on the silicon carbide fibers. These fibers having the debond coating can be added to composite forming materials and the mixture can be treated to form a consolidated composite. A more preferred way to make the consolidated composite is to place the silicon carbide fibers with the initial metal film coating into the composite forming materials and then to heat the mixture to form the debond coating in situ on the fibers and to form the consolidated composite. Preferred heating techniques include high temperature annealing, hot-pressing, or hot isostatic pressing (HIP).

DESCRIPTION OF THE PREFERRED EMBODIMENTS

Figure 1A:
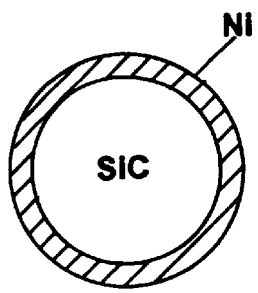
FIGS. 1 (a)–(d) presents schematic cross-sectional views of the silicon carbide fiber and the possible layers in the reaction products.
Figure 1B:
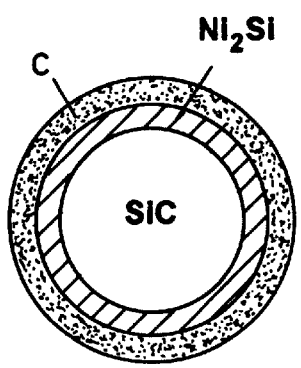
Figure 1C:
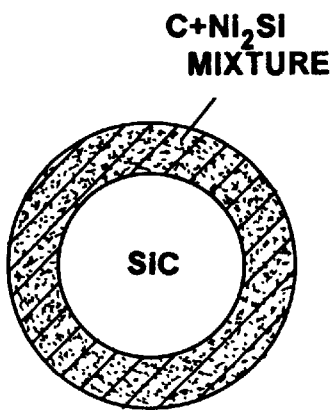
Figure 1D:
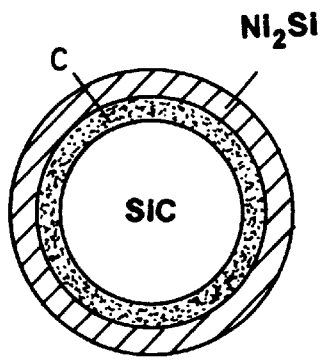

In general, interphase modifications are required to control bonding between the fiber reinforcements and the matrix in composite materials. For ceramic matrix composites a debonding layer is beneficial for improving composite properties. Tailored debond layers promote multiple crack initiations, and crack deflection or branching during propagation, all of which absorb energy and make for tougher composite materials. Improved, in situ produced debond coatings have been formulated which may be used in composites to produce superior products.

An in situ-formed debond coating may be synthesized by the following sequence. Using standard, low cost plating techniques, a thin film of nickel may be solution plated by either electrodeposition or electroless deposition on fibers in a SiC tow such as Nicalon fibers. A chemical coating technique, such as the two mentioned above, can penetrate the tow so that fewer missed or bare spots are anticipated. Further, the metal layer should be flexible so that spallation of the coating is minimized.

Processing of the fibers into a composite would then proceed as normal such as with layup, matrix infiltration or coating, and consolidation. During the final composite processing steps, a high temperature anneal, hot-press, or hot isostatic pressing (HIP), would cause the nickel layer to react with the outermost portion of the SiC fiber and form nickel silicide, $Ni_2Si$. Pressure is not required for the Ni+Si reaction to proceed. However, pressure is generally useful to consolidate the matrix phase of coated fibers.

Carbon must be released for this reaction to proceed since the reaction is:

$4Ni+2SiC \rightarrow 2Ni_2Si+2C$

Depending on the heat treatment, the carbon will either form small pockets or a complete layer in the interphase of the composite. The preferred temperature for carrying out the reaction is from about 350° C. to about 550° C.

FIG. 1 (a) illustrates the cross-section of a silicon carbide fiber that has a thin coating of Ni prior to reaction. The amount of nickel deposited will control the amount of carbon released to form the debond layer.

FIGS. 1 (b)–(d) show three potential scenarios for the debond layers after reaction. The resultant debond coating morphology will depend on the various surface and volume energies of the fiber, reaction products, and matrix as well as diffusion rates. In FIG. 1 (b), the SiC fiber has a first inner layer of $Ni_2Si$ and an outer layer of carbon. In FIG. 1 (c), the SiC fiber has an outer layer of a mechanically-weak mixture of carbon and $Ni_2Si$. In FIG. 1 (d), the SiC fiber has a first inner layer of carbon and an outer layer of $Ni_2Si$. There is some evidence for the carbon collecting at the free surface (as in FIG. 1 (b)) when the Ni and SiC are reacted isolated from a matrix. The short times and low temperatures involved in the reaction due to its large free energy change constrain the diffusion distance the carbon could achieve. Thus, the carbon reaction product is near the interface at all times. At the interface the carbon will perform its debonding function independent of which resultant morphology is produced. In either event, a weak mechanical bond or debonding layer is established between the remaining fiber and matrix. Clean deposition of a thin nickel layer will be the most important factor for quality control. When the nickel coating is applied, it is a layer. Once reacted, and especially if the mixture morphology occurs, the debond coating may not always be a "layer" anymore. It remains a coating, however, since it envelopes the fiber.

Figure 2:
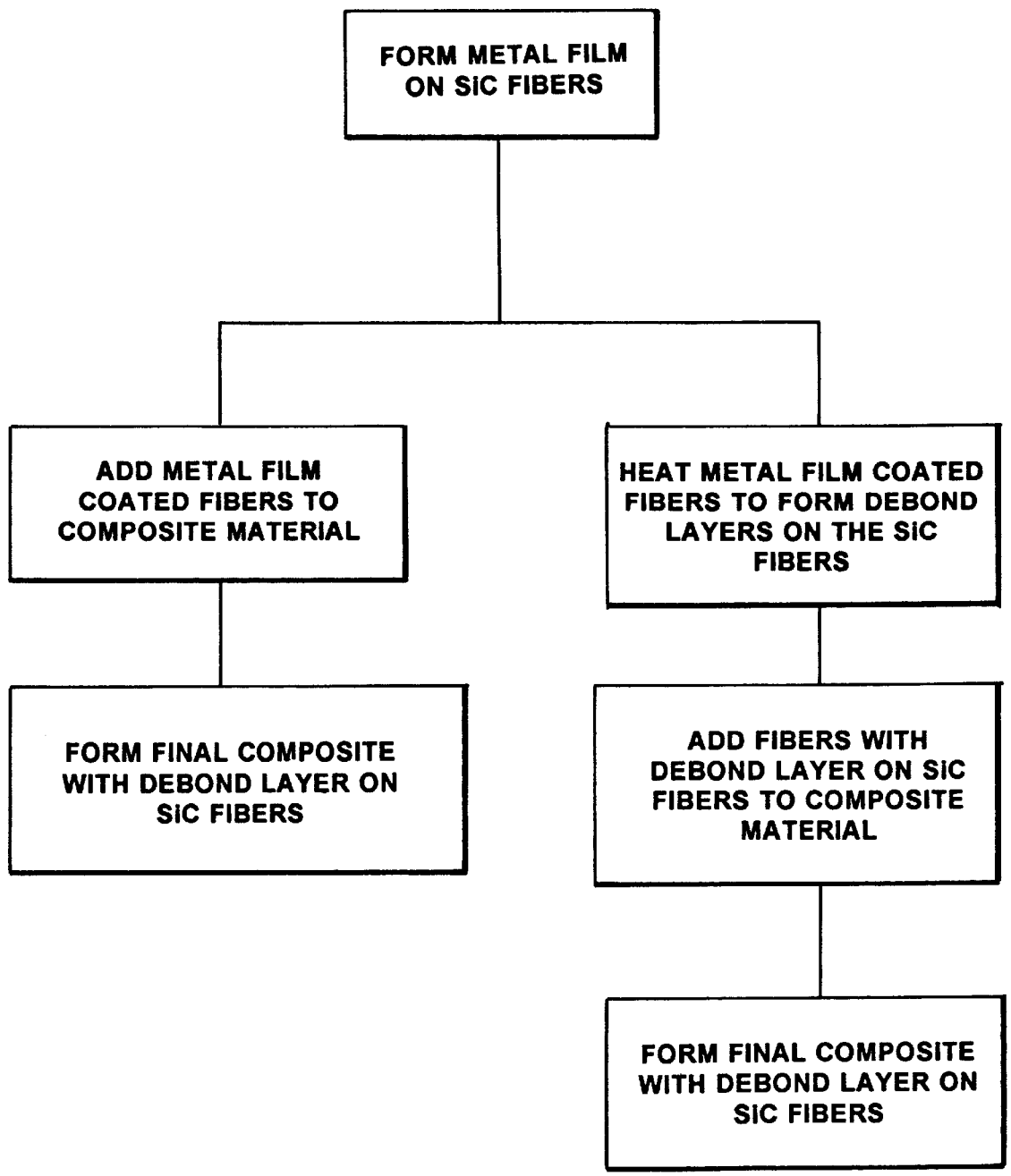
FIG. 2 is a process flow sheet illustrating the two embodiments of the process invention.

The advantages of this direct technique are that the composite is easier and cheaper to fabricate. Due to more complete penetration of the fiber tow, the composite will have a better, more reliable performance during processing. The in situ formation of the debond layer means there is no extra processing steps required. The nickel-coated fibers also provide a high thermal conductivity path during heating. This process is shown on the left side of FIG. 2.

An alternative procedure to make the composite is to form the debond layer at any time by heat treating the nickel-coated SiC fibers. Thus, if desirable, the debond layer could be formed prior to composite processing as shown on the right side of FIG. 4. This procedure, however, introduces an additional heating step.

The fibers with the pre-formed debond coating have to be embedded in a matrix to perform their debonding function. Conceivably, this could be done without heat, such as in the case of a cured polymer matrix. It is believed that all ceramic matrices would require heating. It is assumed in these processes that the chemical reactions caused by the heating will not destroy the carbon produced by the first reaction. For example, one would not want to put the fibers having the $SiC/Ni_2Si/C$ combination into an aluminum matrix because the Al and C would react to form aluminum carbide and there would no longer be a debond layer.

Other metals besides nickel may be used in the practice of the invention. As described above with respect to nickel, the function of the the metal thin film is to react with silicon carbide at the annealing temperature to form a debond coating of a metal silicide and carbon. Suitable metals in the invention are any metals that react with silicon carbide to form a metal silicide and carbon as reaction products. Examples of other suitable metals include iron, copper, cobalt, tin, palladium, platinum and mixtures and alloys thereof. For example, an Fe layer would perform in essentially the same manner as a nickel layer. However, nickel is preferred over iron because it would be difficult to electrodeposit the Fe as easily as the nickel, and oxidation of the Fe may become a problem. A metal silicon alloy may also be used, though it is less preferable.

The two composite making processes result in products which may be in the same product if all the same materials were used in each case. However, some systems might be amenable to (1) the process where the metal coated fibers are placed in the composite and the consolidated composite is formed by heating with the simultaneous in situ-formed debond coating on the fibers or to (2) the process where the in situ-formed debond coating is first formed on the fibers and then these coated fibers are added to the composite, but not to both.

Having described the basic aspects of the invention, the following example is given to illustrate a specific embodiment thereof.

EXAMPLE 1

This example illustrates the reaction which takes place between the adjacent Ni film and the silicon carbide.

A Ni/SiC multilayer sample was synthesized as an analog of a fiber/matrix composite. The multilayer sample consisted of alternating Ni and SiC layers of equal thickness of 40 nm so that the bilayer pair was 80 nm. The total sample was made of 25 bilayers with a thickness of approximately 2,000 nm which is 2 microns. The multiple reaction interfaces mimic the numerous coated fiber interfaces found in composites and allows for easier determination of the reaction products via differential scanning calorimetry (DSC) and X-ray diffraction (XRD).

Figure 3:
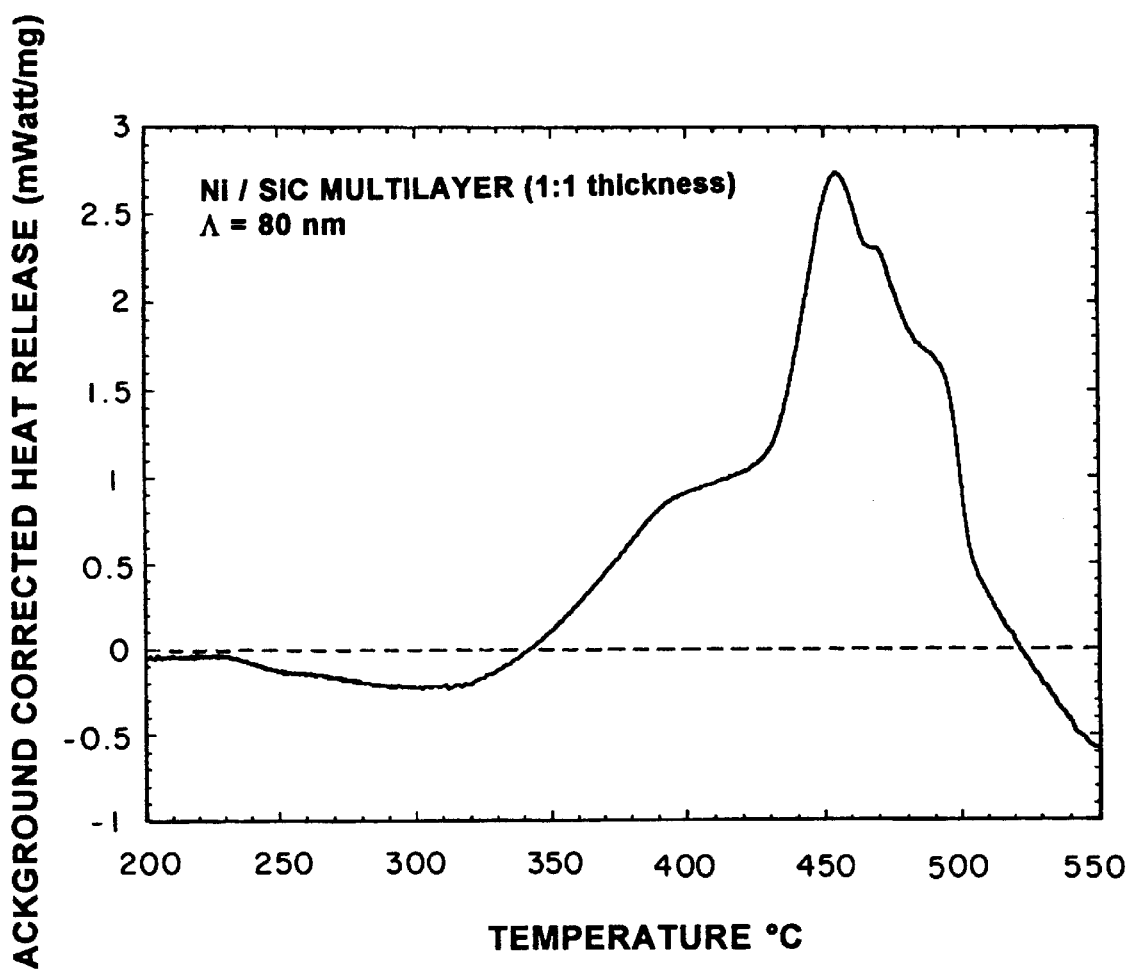
FIG. 3 is differential scanning calorimetry heating trace (DSC) for the Ni/SiC multilayer sample.

FIG. 3 is the DSC output at a heating rate of 20° C. per minute for the Ni/SiC sample. It indicates a heat release and thus a chemical reaction was occurring. Samples which had been heat treated to specific temperatures and quenched were examined for reaction products by XRD. A temperature of 410° C. represents a temperature before the major peak in the DSC scan and a temperature of 510° C. represents a temperature after the major peak in the DSC scan.

Figure 4:
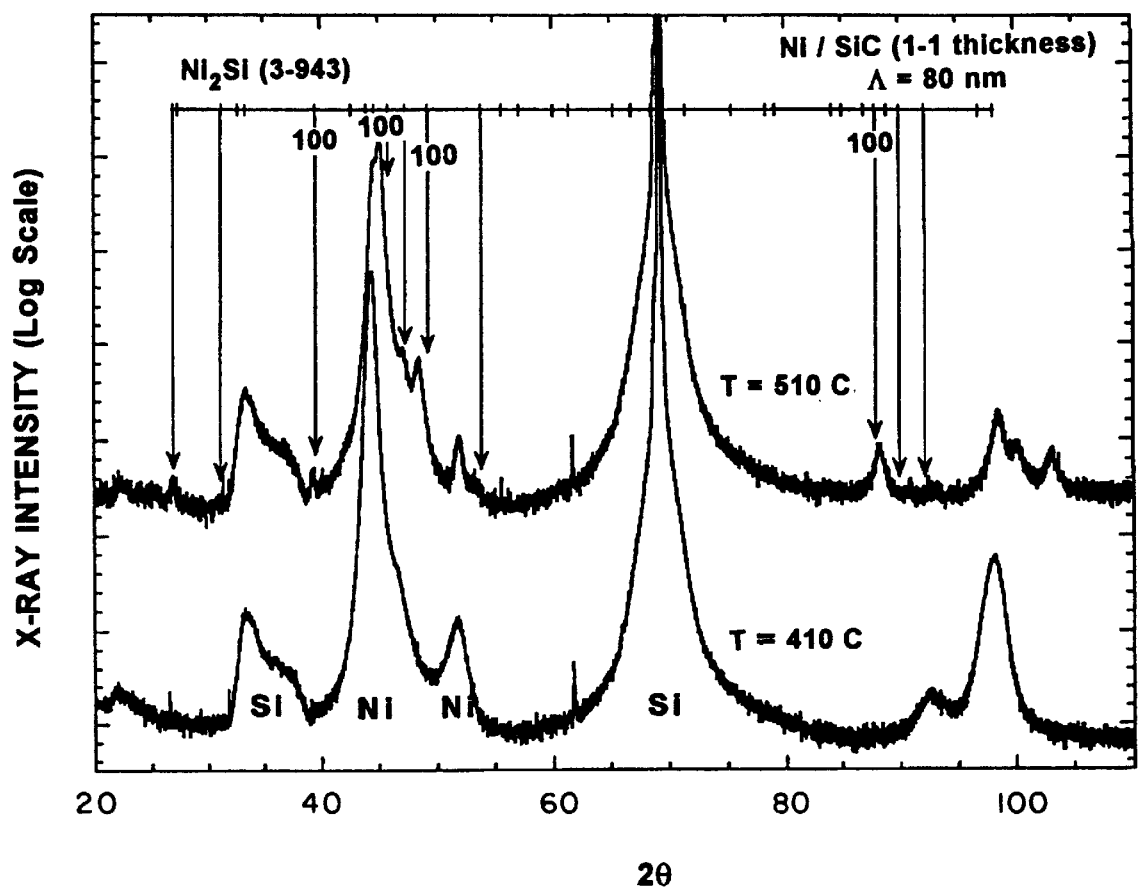
FIG. 4 is an X-ray diffraction scan (XRD) showing that the reaction product formed is $Ni_2Si$.

The XRD plot in FIG. 4 shows conclusively that one of the reaction products formed after the DSC scan to 510° C. was $Ni_2Si$. The vertical, downward pointing arrows indicate the positions of expected x-ray diffraction peaks based upon previously published industry standard powder diffraction files. The number of the file or "card" is shown. The fact that three or more arrows line up establish that $Ni_2Si$ was present in the sample under analysis.

The carbon which is a by-product of the reaction, while not indicated in the XRD plot, must still be present due to mass conservation. Carbon is not easily observed by x-rays because carbon, being a low-Z element, does not scatter x-rays very effectively. The short times and low temperatures involved in the reaction constrain the diffusion distance the carbon could achieve. Thus, the carbon is inferred to be near the interface. At the interface the carbon will perform its debonding function. The higher modulus of the $Ni_2Si$ is believed to make it very useful for debonding.

It is understood that the foregoing detailed description is given merely by way of illustration and that many variations may be made therein without departing from the spirit of this invention.

What is claimed is:

1. A process of forming a debond coating on silicon carbide fibers comprising the steps of
   a) forming a thin film of a metal or metal silicon alloy on silicon carbide fibers, wherein the metal or metal silicon alloy is selected as being capable of reacting with silicon carbide to form a metal silicide and carbon; and
   b) annealing the fibers at a temperature sufficient to produce an effective amount of a metal silicide and carbon to form a debond coating on the silicon carbide fibers.

2. A process according to claim 1 wherein the annealing temperature is from 350° C. to 550° C.

3. A process according to claim 1, wherein the metal is selected from the group consisting of nickel, iron, copper, cobalt, tin, palladium, platinum and mixtures and alloys thereof.

4. A process according to claim 1, wherein the metal is nickel and the thin film of nickel is formed by solution plating.

5. A process according to claim 4, wherein the solution plating is by electrodeposition.

6. A process of forming a composite comprising the steps of:
   a) forming a thin film of a metal or metal silicon alloy on silicon carbide fibers, wherein the metal or metal silicon alloy is selected as being capable of reacting with silicon carbide to form a metal silicide and carbon;
   b) adding the coated fibers made in step (a) to a composite; and c) heating the composite at a temperature sufficient to produce an effective amount of a metal silicide and carbon to form a debond coating on the silicon carbide fibers at or near the interface of the silicon carbide fibers in the composite.

7. A process according to claim 6 wherein the annealing temperature is from about 350° C. to about 550° C.

8. A process according to claim 6, wherein the metal is selected from the group consisting of nickel, iron, copper, cobalt, tin, palladium, platinum and mixtures and alloys thereof.

9. A process of forming a composite according to claim 6, wherein the heating is done by high temperature annealing, hot-pressing, or hot isostatic pressing (HIP).

10. A process of forming a composite according to claim 6, wherein the heating is done at a temperature of about 400° C.

11. A process according to claim 6, wherein the metal is nickel and the step of forming the thin film is by solution plating.

12. A process of forming a composite according to claim 6, wherein the heating is done under pressure.

13. A process of forming a composite comprising the steps of:
  a) forming a thin film of a metal or metal silicon alloy on silicon carbide fibers, wherein the metal or metal silicon alloy is selected as being capable of reacting with silicon carbide to form a metal silicide and carbon;
  b) annealing the fibers at a temperature sufficient to produce an effective amount of a metal silicide and carbon to form a debond coating on the silicon carbide fibers;
  c) adding the fibers of step (b) to a composite; and
  d) treating the composite of step (c) to form a consolidated composite.

14. A process according to claim 13 wherein the annealing temperature is from 350° C. to 550° C.

15. A process according to claim 13, wherein the metal is selected from the group consisting of nickel, iron, copper, cobalt, tin, palladium, platinum and mixtures and alloys thereof.

16. A process according to claim 13, where the treating of step (d) involves curing a polymer matrix.

17. A process according to claim 13, where the treating of step (d) involves heating to form the consolidated composite.

18. A process according to claim 17, wherein the heating is done by high temperature annealing.

19. A process according to claim 17, wherein the heating is done by hot-pressing.

20. A process according to claim 17, wherein the heating is done by hot isostatic pressing (HIP).

21. A process of forming a composite according to claim 13, wherein the annealing in step (b) is done at a temperature of about 400° C.

* * * * *